(12) United States Patent
Marzorati et al.

(10) Patent No.: US 10,965,659 B2
(45) Date of Patent: Mar. 30, 2021

(54) REAL-TIME COOKIE FORMAT VALIDATION AND NOTIFICATION

(71) Applicant: International Business Machines Corporation, Armonk, NY (US)

(72) Inventors: Mauro Marzorati, Lutz, FL (US); Michael J. Santelia, Raleigh, NC (US); Aaron K. Baughman, Silver Spring, MD (US); Brian W. Jensen, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 16/186,385

(22) Filed: Nov. 9, 2018

(65) Prior Publication Data
US 2020/0153809 A1  May 14, 2020

(51) Int. Cl.
| | | |
|---|---|---|
| *H04L 9/06* | (2006.01) | |
| *H04L 29/06* | (2006.01) | |
| *H04L 29/08* | (2006.01) | |
| *G06F 16/951* | (2019.01) | |
| *G06F 16/23* | (2019.01) | |

(52) U.S. Cl.
CPC .......... *H04L 63/08* (2013.01); *G06F 16/2365* (2019.01); *G06F 16/951* (2019.01); *H04L 9/0643* (2013.01); *H04L 63/0281* (2013.01); *H04L 67/146* (2013.01)

(58) Field of Classification Search
CPC ..... H04L 63/08; H04L 67/146; H04L 9/0643; H04L 63/0281; H04L 67/02; H04L 63/168; G06F 16/951; G06F 16/2365; G06F 16/958

USPC .......................................................... 726/3
See application file for complete search history.

(56) References Cited

U.S. PATENT DOCUMENTS

| | | | |
|---|---|---|---|
| 6,330,566 B1 | 12/2001 | Durham | |
| 7,779,103 B1 | 8/2010 | Fikes et al. | |
| 7,925,694 B2 * | 4/2011 | Harris | H04L 67/2842 709/203 |

(Continued)

FOREIGN PATENT DOCUMENTS

CN      105897694      8/2016

OTHER PUBLICATIONS

Ayadi, I. et al., "HTTP Session Management: Architecture and Cookies Security", 2011 Conference on Network and Information Systems Security (SAR-SSI), IEEE, 2011, Total 7 pages.

(Continued)

*Primary Examiner* — Shan E Elahi
(74) *Attorney, Agent, or Firm* — Konrad Raynes Davda & Victor LLP; Janaki K. Davda

(57) ABSTRACT

Provided are techniques for real-time cookie format validation and notification. It is determined that a web page with the real cookie is loaded onto a browser at a client. In response to determining that a control cookie does not exist for the real cookie, a matching cookie pattern for the real cookie is searched for in a cookie patterns database. In response to determining that the matching cookie pattern has been found for the real cookie, the control cookie is created. In response to determining that the matching cookie pattern has not been found for the real cookie, a notification is provided that the real cookie does not have a conforming format.

18 Claims, 16 Drawing Sheets

(56) References Cited

U.S. PATENT DOCUMENTS

| | | | |
|---|---|---|---|
| 2002/0007317 A1* | 1/2002 | Callaghan | G06Q 30/0633 705/26.8 |
| 2003/0018707 A1 | 1/2003 | Flocken | |
| 2004/0064824 A1* | 4/2004 | McNeely | H04L 67/02 719/316 |
| 2004/0205149 A1* | 10/2004 | Dillon | H04L 65/105 709/217 |
| 2006/0015743 A1* | 1/2006 | Camaisa | H04L 67/02 713/182 |
| 2006/0288220 A1* | 12/2006 | Pennington | H04L 63/02 713/176 |
| 2008/0034413 A1 | 2/2008 | He et al. | |
| 2008/0225720 A1 | 9/2008 | Khemani et al. | |
| 2008/0225748 A1 | 9/2008 | Khemani et al. | |
| 2008/0225753 A1 | 9/2008 | Khemani et al. | |
| 2008/0229381 A1 | 9/2008 | Sikka et al. | |
| 2009/0006861 A1* | 1/2009 | Bemmel | G06F 21/445 713/189 |
| 2009/0193129 A1* | 7/2009 | Agarwal | H04L 67/28 709/229 |
| 2010/0095018 A1 | 4/2010 | Khemani et al. | |
| 2010/0325588 A1 | 12/2010 | Reddy et al. | |
| 2011/0035784 A1* | 2/2011 | Jakobsson | H04L 67/02 726/2 |
| 2011/0302641 A1* | 12/2011 | Hald | G06F 21/43 726/7 |
| 2012/0036178 A1 | 2/2012 | Gavini et al. | |
| 2013/0185349 A1* | 7/2013 | Broda | H04L 67/145 709/203 |
| 2014/0082715 A1* | 3/2014 | Grajek | G06F 16/955 726/8 |
| 2015/0304305 A1* | 10/2015 | Junod | H04L 63/14 726/9 |
| 2016/0164861 A1* | 6/2016 | Treleaven | H04L 63/08 726/7 |
| 2016/0253521 A1* | 9/2016 | Esmailzadeh | H04L 63/10 726/4 |
| 2016/0359904 A1* | 12/2016 | Ben Ezra | H04L 63/08 |
| 2018/0041589 A1 | 2/2018 | Bolger et al. | |

OTHER PUBLICATIONS

English Machine Translation for CN105897694, published on Aug. 24, 2016, Total 16 pp.

Defuse Security, "Salted Password Hashing—Doing it Right", [online], [Retrieved on Oct. 23, 2018]. Retrieved rom the Internet at <URL: https://crackstation.net/hashing-security.htm>, Total 10 pp.

Huba, W., "An Analysis of Various Web Tracking Methods", Nov. 16, 2012, Thesis, Rochester Institute of Technology, 2012, Total 80 pp.

Tappenden, A.F. et al., "Cookies: A Deployment Study and the Testing Implications", ACM Transactions on the Web, vol. 3, No. 3, Article 9 (Jun. 2009), Total 49 pages.

Wikipedia, "Neural Turing Machine", [online], [Retrieved on Oct. 12, 2018]. Retrieved from the Internet at <URL: https://en.wikipedia.orgiwiki/Neural_Turing_machine>, last edited on Aug. 23, 2018, at 21:15 (UTC), Total 1 p.

Wikipedia, "Theano (software)", [online], [Retrieved on Oct. 12, 2018]. Retrieved from the Internet at <URL: https://en.wikipedia.org/wiki/Theano>, last edited on Oct. 1, 2018, at 11:11 (UTC), Total 2 pp.

Wikipedia, "Evercookie", [online], [Retrieved on Nov. 7, 2018]. Retrieved from the Internet at <URL: https://en.wikipedia.org/wiki/Evercookie>, last edited on Nov. 14, 2017, at 21:50 (UTC), Total 3 pp.

Wikipedia, "Salt (cryptograph)", [online][retrieved Oct. 21, 2020], pp. 3, https://en.wikipedia.org/wiki/Salt_(cryptography).

* cited by examiner

400 ipcInfo=cc%3dmx%3blc%3des%3bac%3dall;

ipcInfo=cc%3dus%3blc%3den%3bac%3dall;

ipcInfo=cc%3dau%3blc%3den-GB,en-US%3bq%3d0.8,en%3bq%3d0.6%3bac%3dall;

ipcInfo=cc%3dau%3blc%3den-AU,en%3bq%3d0.5%3bac%3dall;

ipcInfo=cc%3Djp%3Blc%3Dja%3Bein%3Dnull%3Becs%3Dnull%3Bedm%3Dproxy.ricoh.co.jp%3Bac%3DaW49bnVsbDtjcz1udWxsO2JyPQ%3D%3D;

ipcInfo=cc%3dau%3blc%3den-US,en%3bq%3d0.8%3bac%3dall;

ipcInfo=cc%3dde%3blc%3dde%3bac%3dall;

ipcInfo=cc%3Dus%3Blc%3Den%3Bac%3Dall;

ipcInfo=cc%3Dus%3Blc%3Den%3Bac%3Dall;

ipcInfo=cc%3Dus%3Blc%3Den%3Bac%3Dall;

ipcInfo=cc%3dca%3blc%3den%3bac%3dall;

ipcInfo=cc%3dca%3blc%3den%3bac%3dall;

ipcInfo=cc% ipcInfo=cc%3dca%3blc%3den%3bac%3dall;

ipcInfo=cc%3Djp%3Blc%3Dja%3Bac%3Dall;

ipcInfo=cc%3dus%3blc%3den%3bac%3dall;

ipcInfo=cc%3djp%3blc%3dja%3bac%3dall;

ipcInfo=cc%3Dus%3Blc%3Den%3Bac%3Dall;

ipcInfo=cc%3dus%3blc%3den%3bac%3dall;

ipcInfo=cc%3dus%3blc%3den%3bac%3dall;

FIG. 4

REAL-TIME COOKIE FORMAT VALIDATION AND NOTIFICATION

BACKGROUND

1. Field of the Invention

Embodiments of the invention relate to real-time cookie format validation and notification. The validation authenticates the cookie.

2. Description of the Related Art

A web page may include one or more cookies, and a browser downloads the web page for display on a computer. A cookie may be described as a small amount of data that is retrieved from the web page by the browser and stored on the computer. The cookie may be used to remember information for the next time that the same web page is downloaded, to record a user's browsing activity, etc. Cookies may take the form of name-value pairs that store values on client devices for later processing. These values may be overwritten.

SUMMARY

In accordance with embodiments, a computer-implemented method is provided for real-time cookie format validation and notification. The computer-implemented method performs operations. It is determined that a web page with the real cookie is loaded onto a browser at a client. In response to determining that a control cookie does not exist for the real cookie, a matching cookie pattern for the real cookie is searched for in a cookie patterns database. In response to determining that the matching cookie pattern has been found for the real cookie, the control cookie is created. In response to determining that the matching cookie pattern has not been found for the real cookie, a notification is provided that the real cookie does not have a conforming format.

In accordance with other embodiments, a computer program product is provided for real-time cookie format validation and notification. The computer program product comprising a computer readable storage medium having program code embodied therewith, the program code executable by at least one processor to perform operations. It is determined that a web page with the real cookie is loaded onto a browser at a client. In response to determining that a control cookie does not exist for the real cookie, a matching cookie pattern for the real cookie is searched for in a cookie patterns database. In response to determining that the matching cookie pattern has been found for the real cookie, the control cookie is created. In response to determining that the matching cookie pattern has not been found for the real cookie, a notification is provided that the real cookie does not have a conforming format.

In yet other embodiments, a computer system is provided for real-time cookie format validation and notification. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. It is determined that a web page with the real cookie is loaded onto a browser at a client. In response to determining that a control cookie does not exist for the real cookie, a matching cookie pattern for the real cookie is searched for in a cookie patterns database. In response to determining that the matching cookie pattern has been found for the real cookie, the control cookie is created. In response to determining that the matching cookie pattern has not been found for the real cookie, a notification is provided that the real cookie does not have a conforming format.

BRIEF DESCRIPTION OF THE SEVERAL VIEWS OF THE DRAWINGS

Referring now to the drawings in which like reference numbers represent corresponding parts throughout:

FIG. 4 illustrates example cookies in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1A:
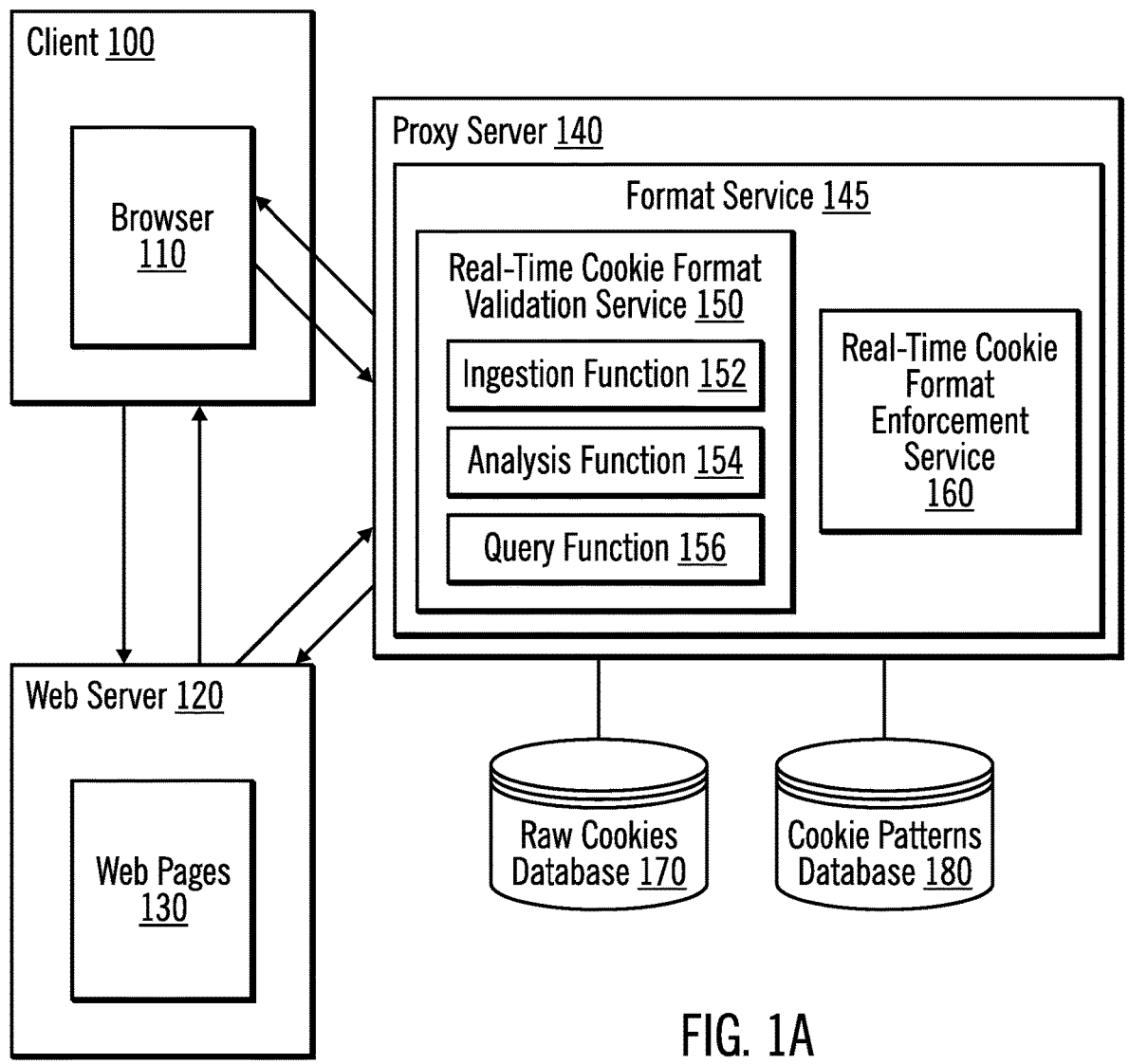
FIG. 1A illustrates, in a block diagram, a computing environment in a proxy server context in accordance with certain embodiments.
Figure 1B:
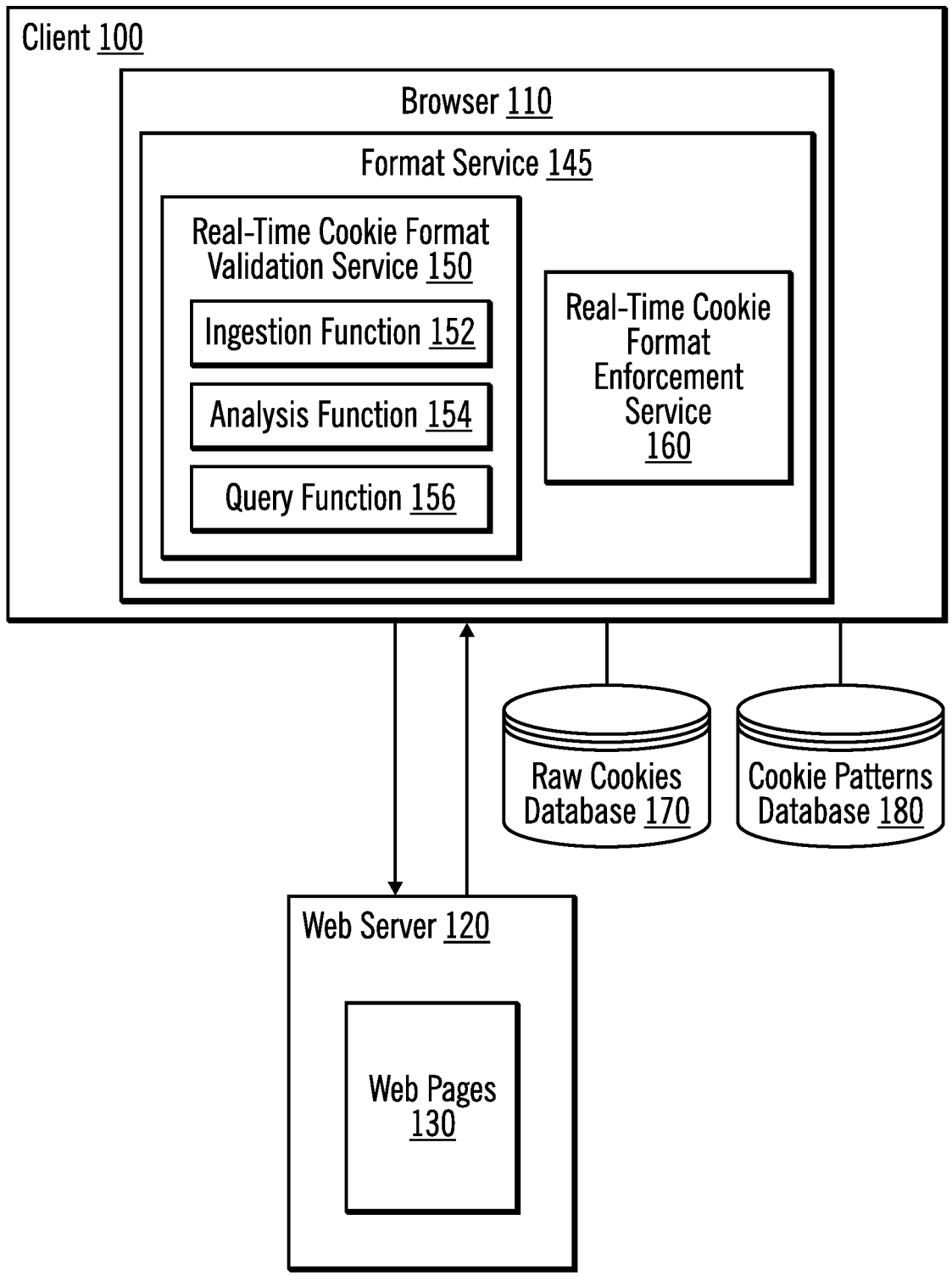
FIG. 1B illustrates, in a block diagram, an alternative computing environment in a client/browser context in accordance with certain embodiments.
Figure 1C:
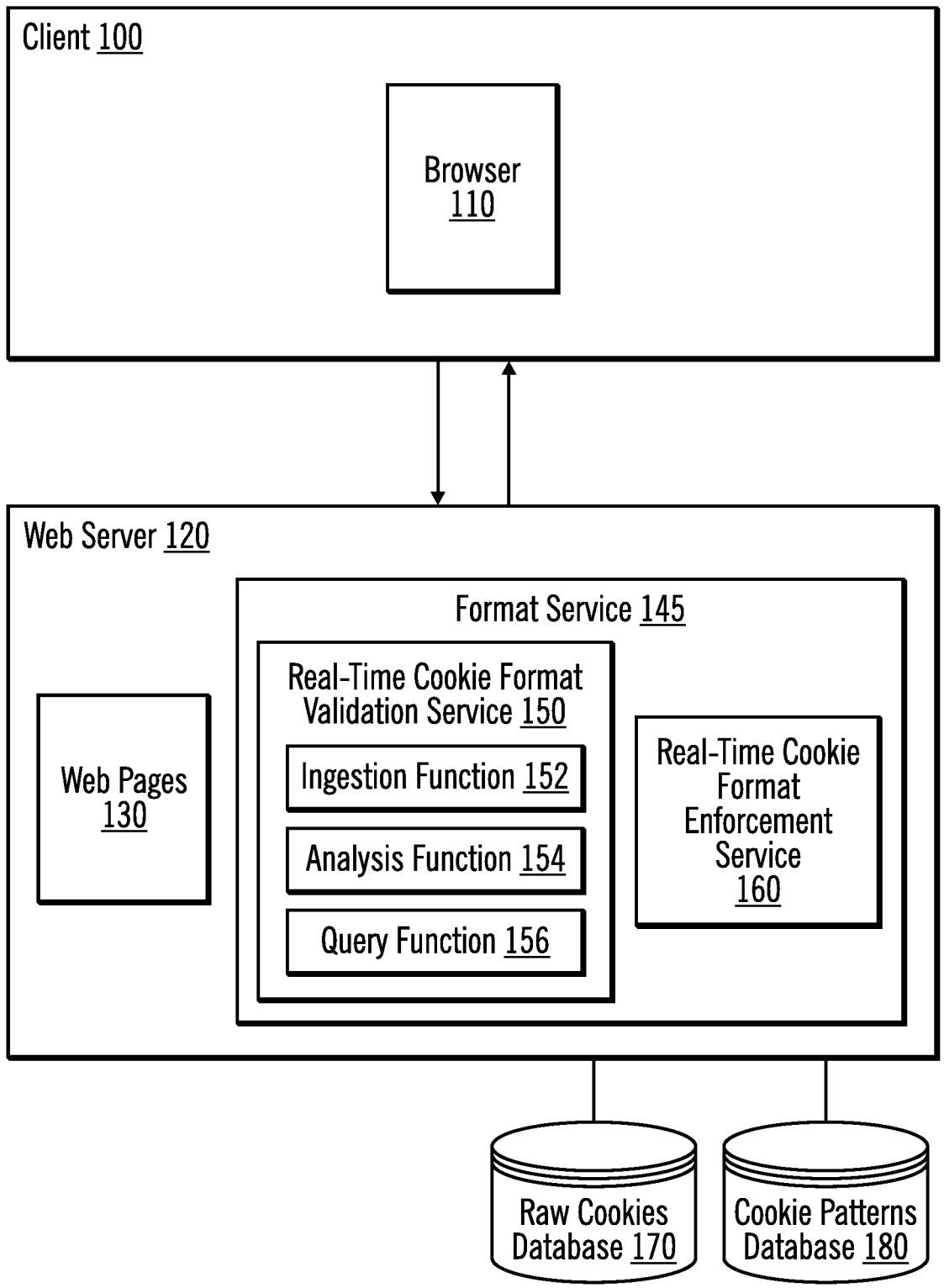
FIG. 1C illustrates, in a block diagram an alternative computing environment in a web server context in accordance with certain embodiments.

Embodiments may be in a proxy server context (FIG. 1A), in a client/browser context (e.g., FIG. 1B), and in a web server context (e.g., FIG. 1C).

FIG. 1A illustrates, in a block diagram, a computing environment in a proxy server context in accordance with certain embodiments. In FIG. 1A, a client 100 includes a browser 110 and communicates with a web server 120 and with a proxy server 140. The web server 120 and the proxy server 140 may also communicate with each other. A web server 120 includes web pages 130. A proxy server 140 includes a format service 145, which includes a real-time cookie format validation service 150 and a real-time cookie format enforcement service 160. With embodiments, the cookie format validation and the cookie format enforcement happen in real-time. The real-time cookie format validation service 150 includes an ingestion function 152, an analysis function 154, and a query function 156. The proxy server 140 is also coupled to a raw cookies database 170 and to a cookie patterns database 180. In certain embodiments, the cookie patterns database 180 stores, for each cookie (e.g., each cookie identifier) a pattern that the cookie should have. In certain embodiments, the client 100 obtains a web page via the proxy server 140, which obtains the web page from the web server 120. In alternative embodiments, the client 100 may obtain a web page directly from the web server 120.

FIG. 1B illustrates, in a block diagram, an alternative computing environment in a client/browser context in accordance with certain embodiments. In FIG. 1B, a client 100 includes a browser 110, which includes the format service 145, which includes the real-time cookie format validation service 150 and the real-time cookie format enforcement service 160. The real-time cookie format validation service 150 includes an ingestion function 152, an analysis function 154, and a query function 156. The client 100 communicates with a web server 120 includes web pages 130. The client 100 is also coupled to a raw cookies database 170 and to a cookie patterns database 180. Although not shown, in certain embodiments, the client 100 may also be coupled to a proxy server.

FIG. 1C illustrates, in a block diagram an alternative computing environment in a web server context in accordance with certain embodiments. In FIG. 1B, a client 100 includes a browser. The client 100 communicates with a web server 120. The web server 120 includes web pages 130 and a format service 145, which includes a real-time cookie format validation service 150 and a real-time cookie format enforcement service 160. The real-time cookie format validation service 150 includes an ingestion function 152, an analysis function 154, and a query function 156. The web server 120 is also coupled to a raw cookies database 170 and to a cookie patterns database 180. Although not shown, in certain embodiments, the client 100 may also be coupled to a proxy server.

The browser 110 may request a web page from the web server 120 for display on the client 100. The web page includes one or more real (original) cookies. In certain embodiments, the real-time cookie format validation service 150 detects that the web page has been downloaded and validates the one or more real cookies. The real cookies may be Hyper Text Transfer Protocol (HTTP) cookies.

The format service 145 may be embodied in a proxy server context (FIG. 1A), in a client/browser context (e.g., FIG. 1B), and in a web server context (e.g., FIG. 1C). In other embodiments, the format service 145 may be embodied in another context.

The proxy server 140 may be described as an intermediary proxy present in a tiered distribution network. The browser 110 may be described as a browser extension. Both the proxy server 140 and the browser 110 have access to the web server 120 sending set-cookie headers. These headers contain a name value pair, such as cookieName=cookieValue, and optionally contain the scope of the real cookie (e.g., specified as the tuple cookieDomain and cookiePath). The ingestion function 152 of the real-time cookie format validation service 150 may harvest these values for the real cookies and submit the values to the analysis function 154 as empirical observations. The analysis function 154 performs processing of real cookies, generation of new cookie patterns, and storage of the new cookie patterns. In certain embodiments, the empirical observations of the values are used over time to establish/deduce the pattern. After subsequent observations, a pattern may be deduced that the format of a Social Security Number (SSN) is ###-##-#### and the pattern of an Employer Identification Number (EIN) is ##-#######.

In certain embodiments, the real-time cookie format validation service 150 collects the empirical observations and uses big data techniques able to deduce any patterns present in the real cookie values. In certain embodiments, the ingestion point is not constrained by the scope of the real cookie. The "scope" of a real cookie may be described as the combination of "domain" (e.g., "*.example.org"), the path within the domain (e.g., "/directory/subdirectory/*"), and a time component (e.g., "expires=2020-12-31:23:59:59"), as set by the web server that issued the real cookie. This informs the browser under which conditions to return the real cookie to the web server, in accordance with internet standards rules (e.g., Request for Comments (RFCs)). An RFC may be described as a document from an Internet Engineering Task Force (IETF) that is the result of committee drafting and subsequent review by interested parties. An RFC is similar to an internet standard. That is, there are embodiments in which a cookie may be processed by the ingestion point, which is independent of this scope. Examples include a browser extension that exports the browser cookie jar for processing either onboard the browser or some remote facility.

In certain embodiments, the real-time cookie format validation service 150 is able to post observations gathered from pages on one domain to another domain, not as real cookies but as query data. Embodiments include a web-metric service for the collection of web metrics. When a web page is accessed, an email viewed, etc., certain information is passed to the web-metric service via query data. With embodiments, the technique for passing the information may likewise be leveraged for the transmission of data. Thus, the real-time cookie format validation service 150 may transmit the received information in another format.

Figure 2:
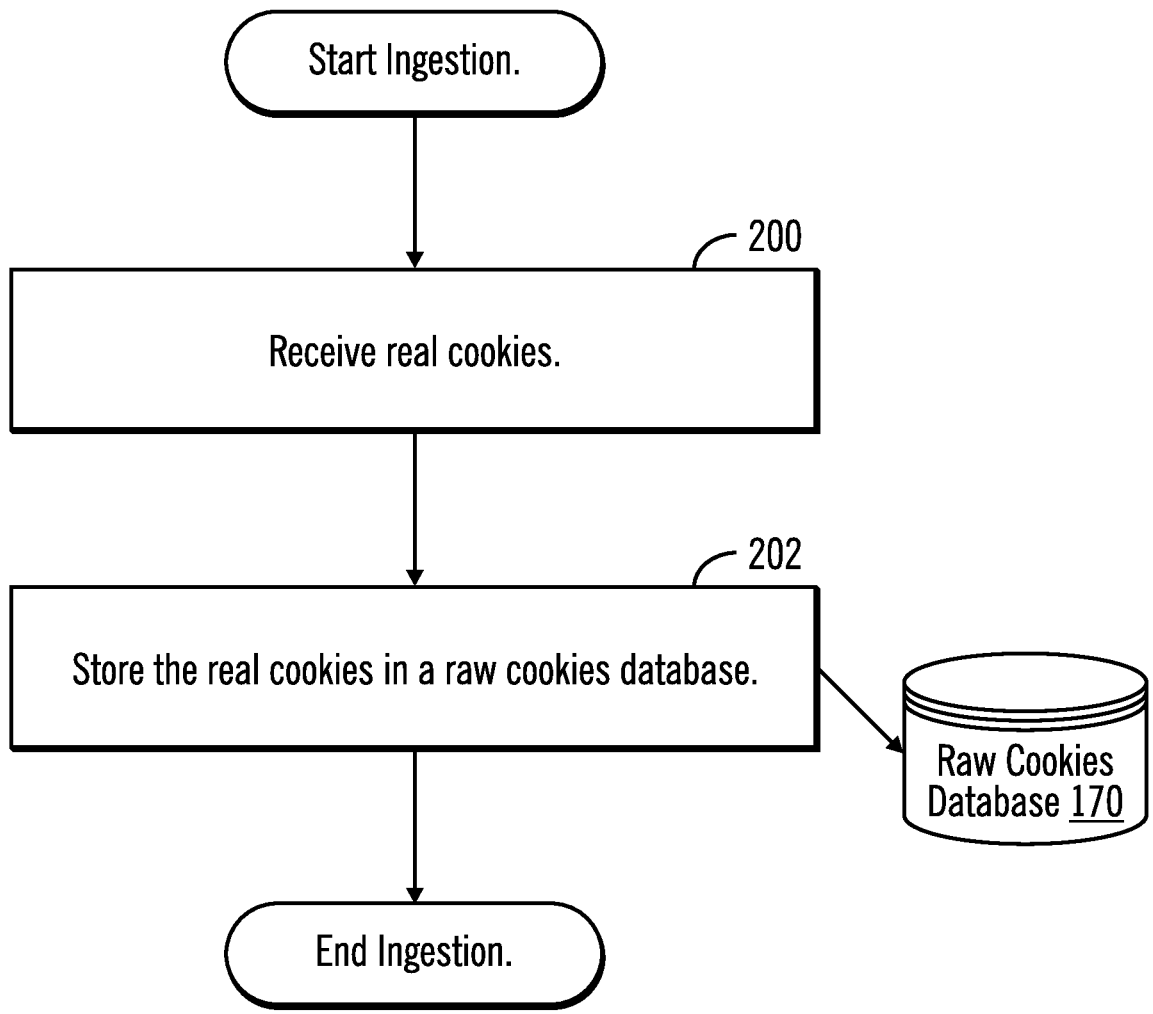
FIG. 2 illustrates, in a flowchart, an ingestion process in accordance with certain embodiments.

FIG. 2 illustrates, in a flowchart, an ingestion process in accordance with certain embodiments. Control begins at block 200 with the ingestion function 152 of the real-time cookie format validation service 150 receiving real cookies (e.g., from a browser displaying a web page, from a web server that serves the web page or from a proxy server). In block 202, the ingestion function 152 of the real-time cookie format validation service 150 stores the values of the real cookies in a raw cookies database 170. In certain embodiments, both the name and the value have semantic meaning and are subject to patterns. For example, Cookie1=value1 TomorrowCookie=YYYYMMDD expireAfter24hrs=true expireAfter2min=true, etc.

Figure 3:
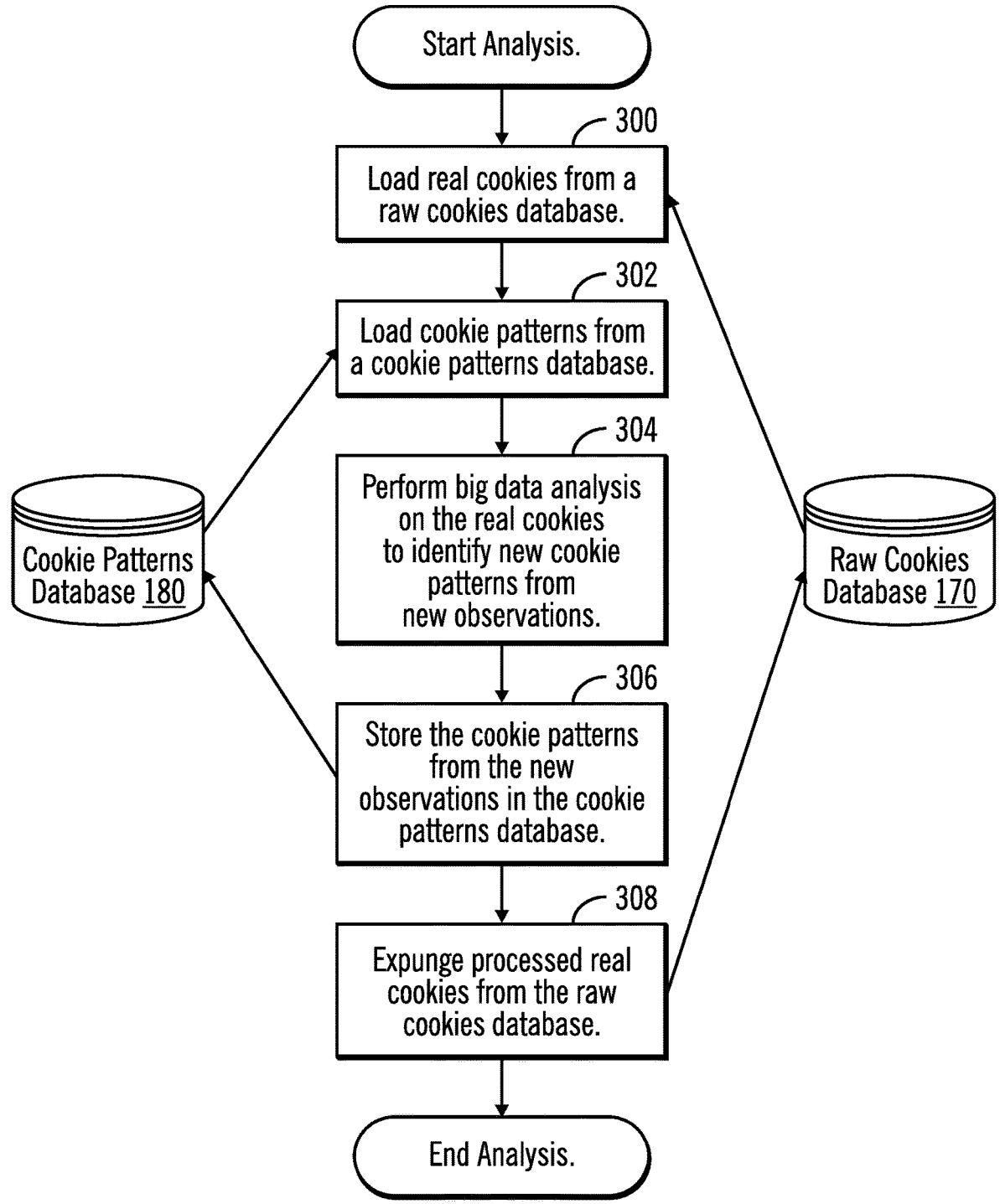
FIG. 3 illustrates, in a flowchart, an analysis process in accordance with certain embodiments.

FIG. 3 illustrates, in a flowchart, an analysis process in accordance with certain embodiments. Control begins at block 300 with the analysis function 154 of the real-time cookie format validation service 150 loading (e.g., retrieving) real cookies from the raw cookies database 170. In block 302, the analysis function 154 of the real-time cookie format validation service 150 loads (e.g., retrieves) cookie patterns from a cookie patterns database 180.

In block 304, the analysis function 154 of the real-time cookie format validation service 150 performs big data analysis on the real cookies to identify new cookie patterns from new observations. The existing cookie patterns may be used to determine which deduced cookie patterns are new cookie patterns.

In block 306, the analysis function 154 of the real-time cookie format validation service 150 stores the cookie patterns from the new observations in the cookie patterns database 180. In block 308, the analysis function 154 of the real-time cookie format validation service 150 expunges (deletes) processed real cookies from the raw cookies database 170.

FIG. 4 illustrates example real cookies 400 in accordance with certain embodiments. The real cookies 400 have the form cookieName=cookieValue and are present on a web page in timed sequential order. The real cookies 400 have the cookie name "ipcInfo", with different values. For example, in the following cookie value "cc%3dus%3blc%3den%3bac%3dall", "%3d" is the code for "=", "%3b" is the code for ";", "cc=us,lc=en,ac=all" is the decoded meaning where "cc" is the choice of country, "lc" is the choice of language, and "ac" is the choice of what will be accepted. For this example, the real-time cookie format validation service 150 deduces a pattern and confidence as follows:

cookieValuePattern="cc%3d . . . %3blc%3d . . . %3bac%3dall
cookieValuePatternConfidence=0.76

For the real cookies 400, the real cookies shown in bold do not fit the pattern and may be ignored.

Figure 5:
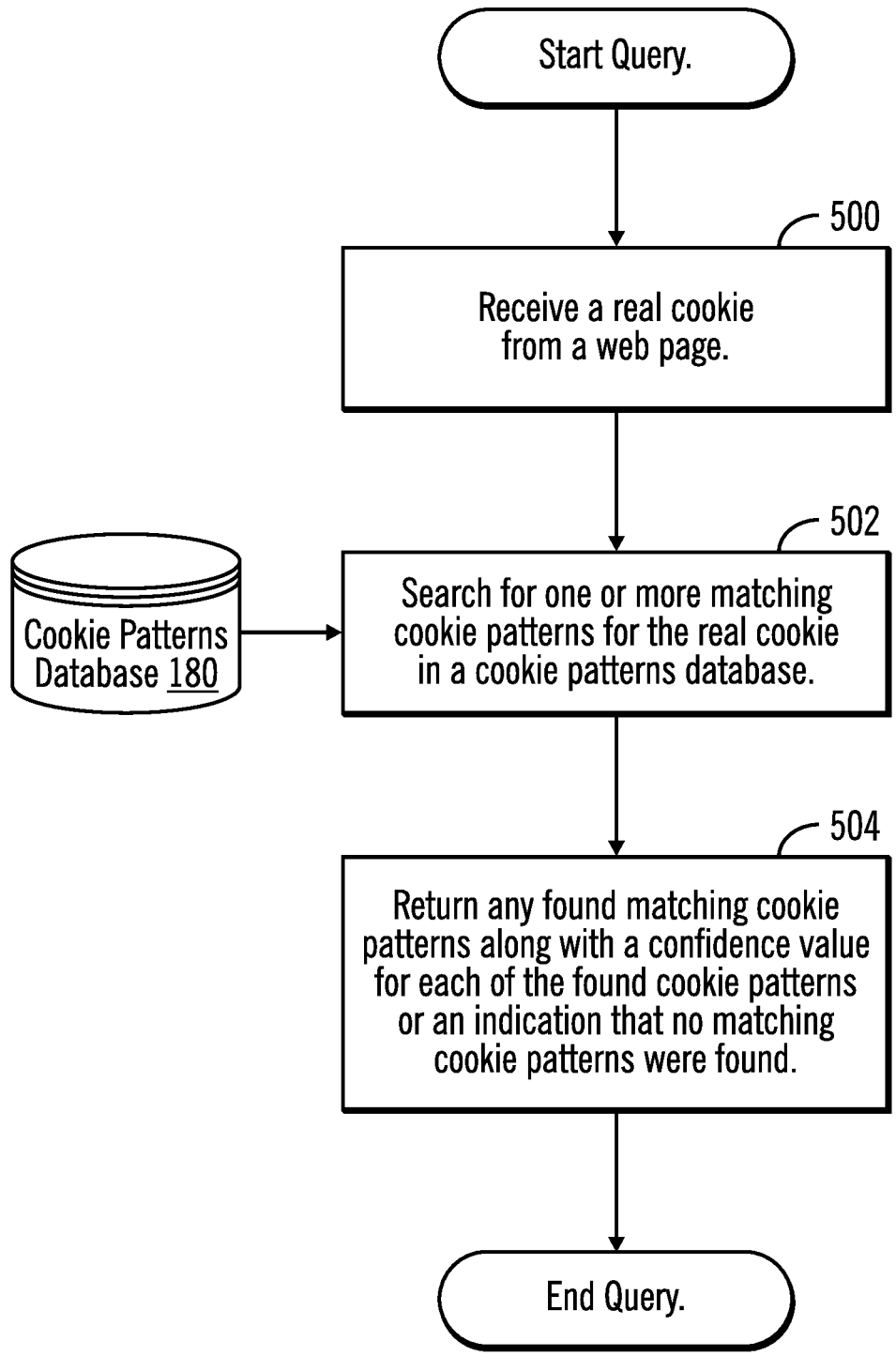
FIG. 5 illustrates, in a flowchart, operations for processing a query in accordance with certain embodiments.

FIG. 5 illustrates, in a flowchart, operations for processing a query in accordance with certain embodiments. Control begins at block 500 with the query function 156 of the real-time cookie format validation service 150 receiving a real cookie from a web page (e.g., from a browser displaying a web page, from a web server that serves the web page or from a proxy server). In block 502, the query function 156 of the real-time cookie format validation service 150 searches for one or more matching cookie patterns for the real cookie in the cookie patterns database 180. In block 504, the query function 156 of the real-time cookie format validation service 150 returns any found matching cookie patterns along with a confidence value for each of the found cookie patterns or returns an indication that no matching cookie patterns were found. In certain embodiments, the real-time cookie format enforcement service 160 requests the validation from the real-time cookie format validation service 150, and the real-time cookie format validation service 150 returns found matching cookie patterns and confidence values or the indication that no matching cookie patterns were found to the real-time cookie format enforcement service 160. In other embodiments, the found matching cookie patterns and confidence values or the indication that no matching cookie patterns were found are returned to the entity that provided the real cookies (e.g., the browser displaying a web page, the web server that serves the web page or the proxy server).

FIGS. 6A, 6B, 6C, and 6D illustrate, in a flowchart, operations for cookie format enforcement in accordance with certain embodiments. Control begins at block 600 with the real-time cookie format enforcement service 160 determining that a web page with a real cookie is loaded onto a browser at a client. In certain embodiments, the browser notifies the real-time cookie format enforcement service 160 that the web page is loading. The web page may be downloaded to the browser from the web server.

In block 602, the real-time cookie format enforcement service 160 determines whether a control cookie exists for the real cookie. If so, processing continues to block 616 (FIG. 6D), otherwise, processing continues to block 604.

Figure 6A:
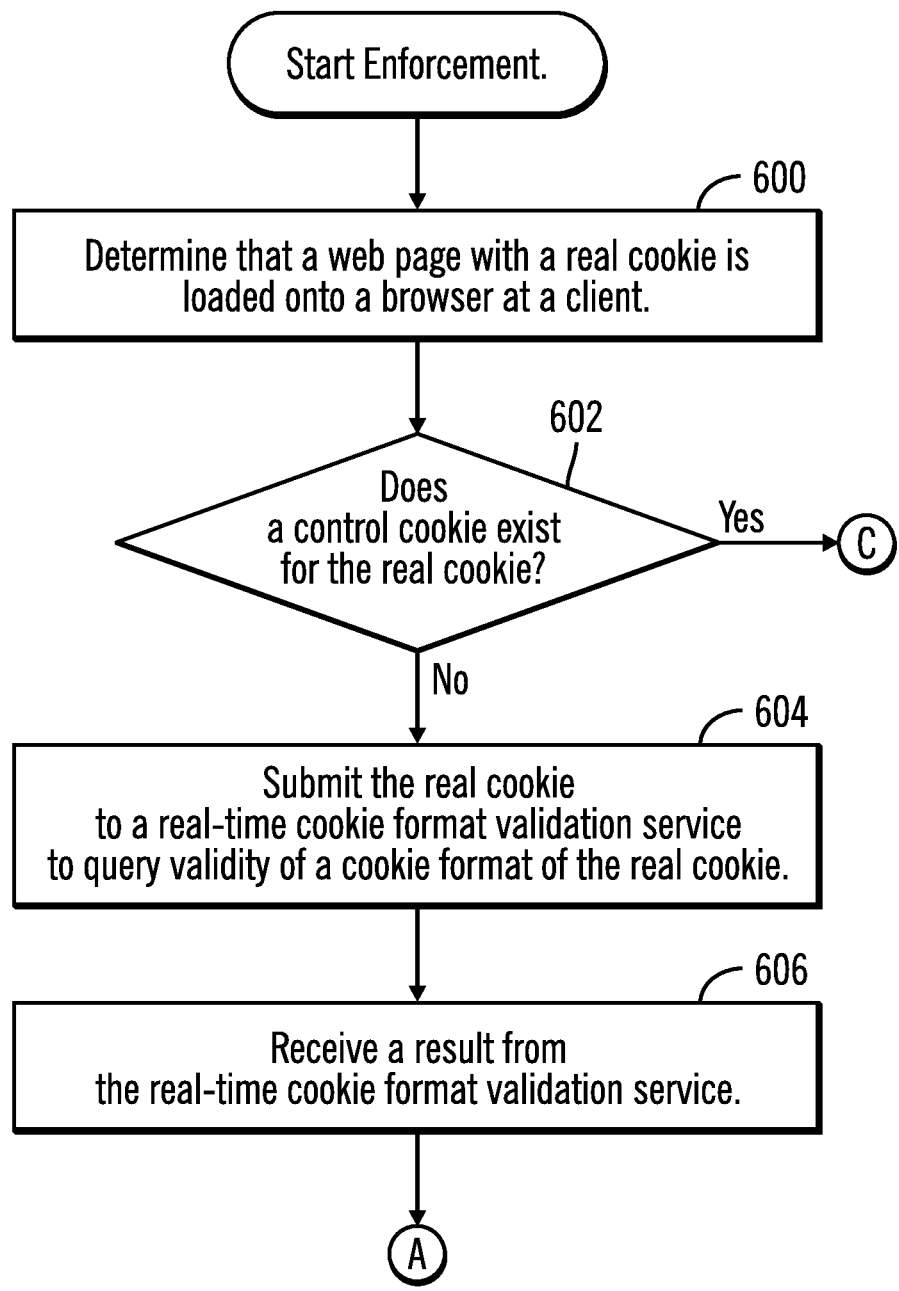
FIGS. 6A, 6B, 6C, and 6D illustrate, in a flowchart, operations for cookie format enforcement in accordance with certain embodiments.
Figure 6B:
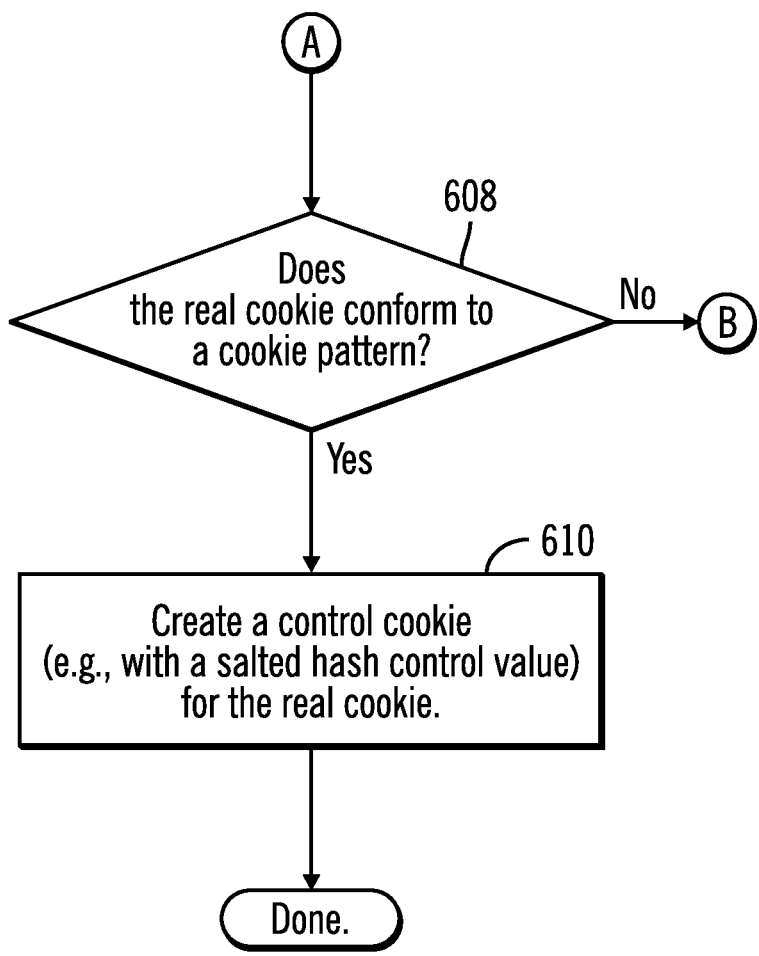

In block 604, the real-time cookie format enforcement service 160 submits the real cookie to the real-time cookie format validation service 150 to query the validity of a cookie format of the real cookie. At this point, control goes to the query function 156 of the real-time cookie format validation service 150 to perform the processing of FIG. 5. In block 606, the real-time cookie format enforcement service 160 receives a result from the query function 156 of the real-time cookie format validation service 150. The result is either a matching cookie pattern with a confidence value or an indication that a matching cookie pattern was not found. From block 606 (FIG. 6A), processing continues to block 608 (FIG. 6B).

In block 608, the real-time cookie format enforcement service 160 determines whether the real cookie conforms to a cookie pattern (e.g., matches a cookie pattern). If no cookie pattern was found, then the real cookie is determined not to conform. In certain embodiments, if a cookie pattern was found with a low confidence value (i.e., below a predetermined threshold), then the real cookie is determined not to conform. If the real cookie conforms to a cookie pattern, processing continues to block 610, otherwise, processing continues to block 612 (FIG. 6C) (for processing of the non-conforming real cookie).

In block 610, the real-time cookie format enforcement service 160 creates a control cookie (e.g., with a salted hash control value) for the real cookie and processing is done for this real cookie. At this point, the web page is served with the real cookie. In cryptography, a salt is random data that is used as an additional input to a hash function that hashes the data. Typically, a new salt is randomly generated for each real cookie. In certain embodiments, the salt and the real cookie are processed with the hash function, which results in a control cookie. The hashing also allows for later authentication. In certain embodiments, the created control cookie is associated with an indication that it is valid.

In block 612, the real-time cookie format enforcement service 160 provides notification of corruption of the real cookie that does not have a conforming format (i.e., does not conform to a cookie pattern).

In block 614, the real-time cookie format enforcement service 160 deletes the real cookie that does not have a conforming format and processing is done for this real cookie. At this point, the web page is served with the real cookie suppressed. Each real cookie that does not have a conforming format may be described as malformed or corrupted. Deleting the real cookie may be described as suppressing the real cookie that is non-conforming in the web page. In certain embodiments, to effect deletion of a real cookie, the real-time cookie format enforcement service 160 sets the real cookie with an expiration date in the past. This causes the browser to set the real cookie and clean up (delete) the real cookie.

Figure 6C:
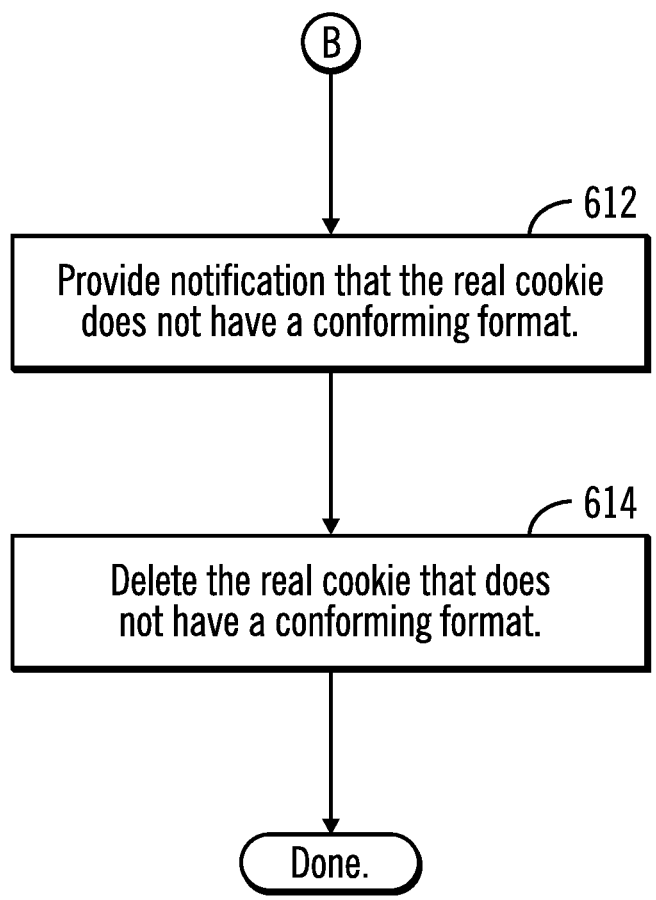
Figure 6D:
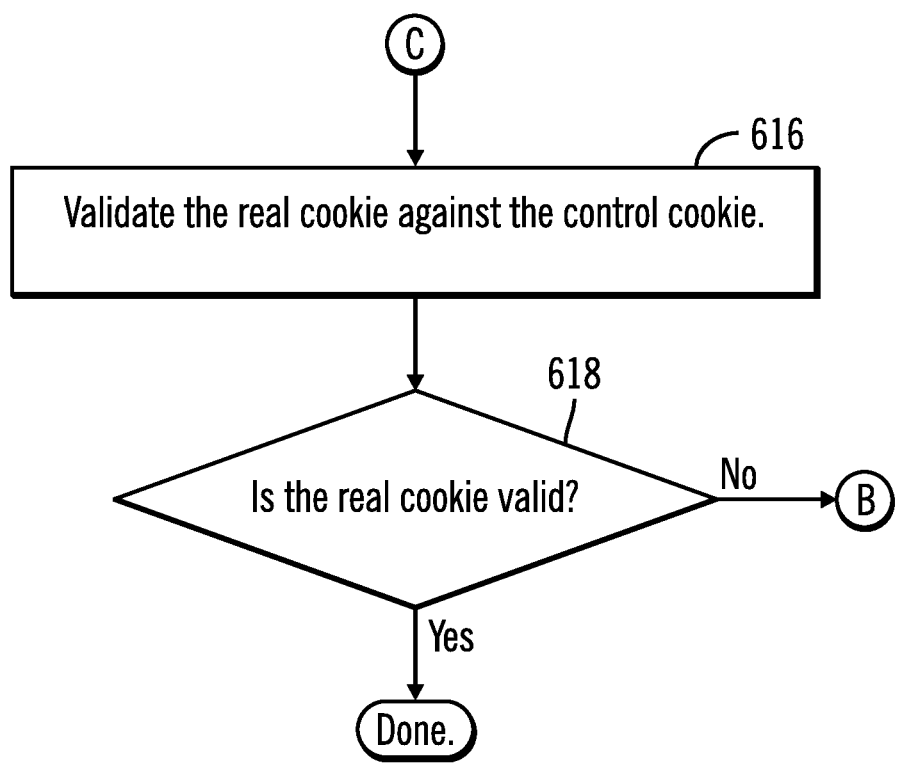

In block 616, the real-time cookie format enforcement service 160 validates the real cookie against the control cookie. In block 618, the real-time cookie format enforcement service 160 determines whether the real cookie is valid (based on the check of block 616). If so, processing is done for this real cookie and the web page is served with the real cookie, otherwise, processing continues to block 612 (FIG. 6C).

In certain embodiments of a client/browser side process, a user visits a web page. Embodiments check whether the control cookie exists. If so, processing embodiments check the validity of the real cookie against a control cookie, otherwise, embodiments perform processing to generate the control cookie.

In certain embodiments, if a control cookie does not exist, the control cookie is created using the real cookie as the template/validator. That is, the control cookie's value is taken from the salted hash of the real cookie.

If the real cookie is in a corrupted format, the real cookie is deleted and a notification to an administrator is sent of the cookie format violation.

Thus, in certain embodiments, when a user visits a web page, the real-time cookie format validation service 150 validates that each real cookie is properly formatted by comparing the real cookie against expected formats (i.e., cookie patterns). If the real cookie is not properly formatted (e.g., invalid), the real cookie is deleted, and a violation notification is sent to the administrator of the web page to fix the real cookie. If the real cookie is properly formatted (e.g., valid) and there is no control cookie, then the real-time cookie format enforcement service 160 sets a control cookie to enroll that user in the watchdog program to ensure that the real cookie does not go out of compliance and is not set with some rogue invalid setting. In other words, once a real cookie is determined to be valid, the real-time cookie format enforcement service 160 is able to ensure authenticity of that real cookie using the control cookie.

Figure 7:
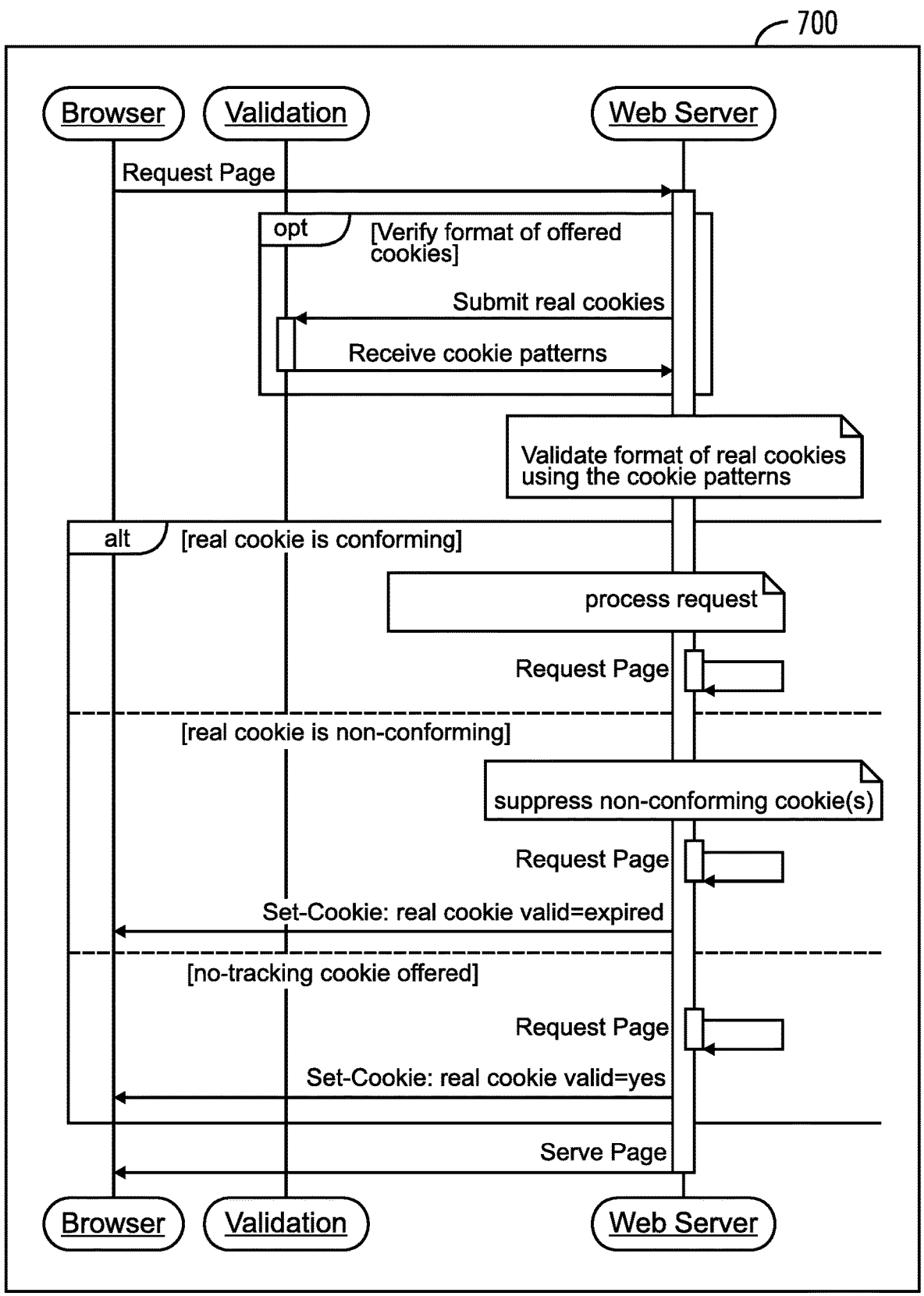
FIG. 7 illustrates a flow of cookie enforcement on a web server in accordance with certain embodiments.

FIG. 7 illustrates a flow 700 of cookie enforcement on a web server in accordance with certain embodiments. For example, in the flow 700, the web server 120 validates the format of real cookies, processes requests for web pages, and suppresses non-conforming real cookies in those web pages.

Figure 8:
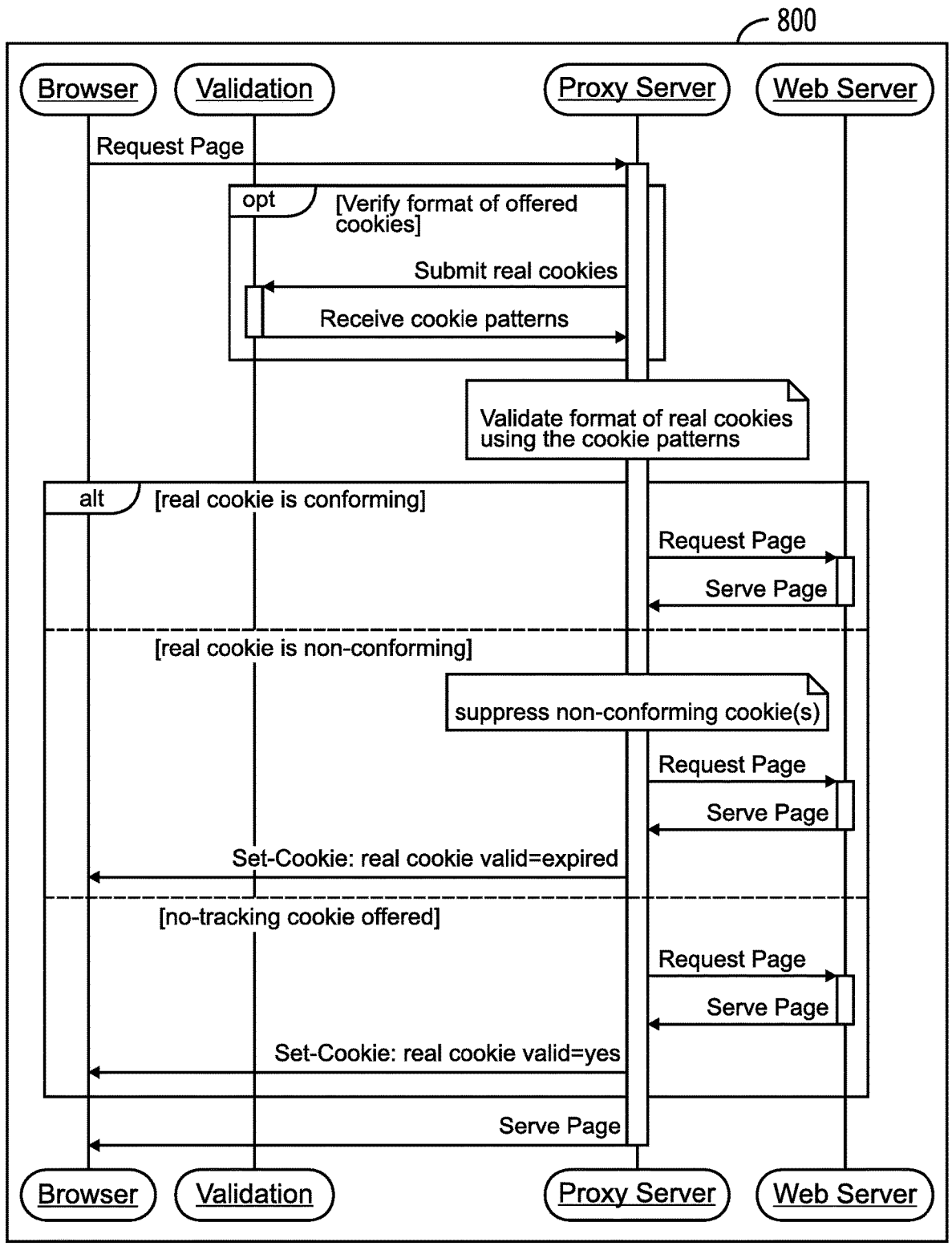
FIG. 8 illustrates a flow of cookie enforcement on a proxy server in accordance with certain embodiments.

FIG. 8 illustrates a flow 800 of cookie enforcement on a proxy server in accordance with certain embodiments. For example, in the flow 800, the proxy server 140 validates the format of real cookies and suppresses non-conforming real cookies in those web pages. The flow 800 may be described as part of a tiered content distribution model.

Figure 9:
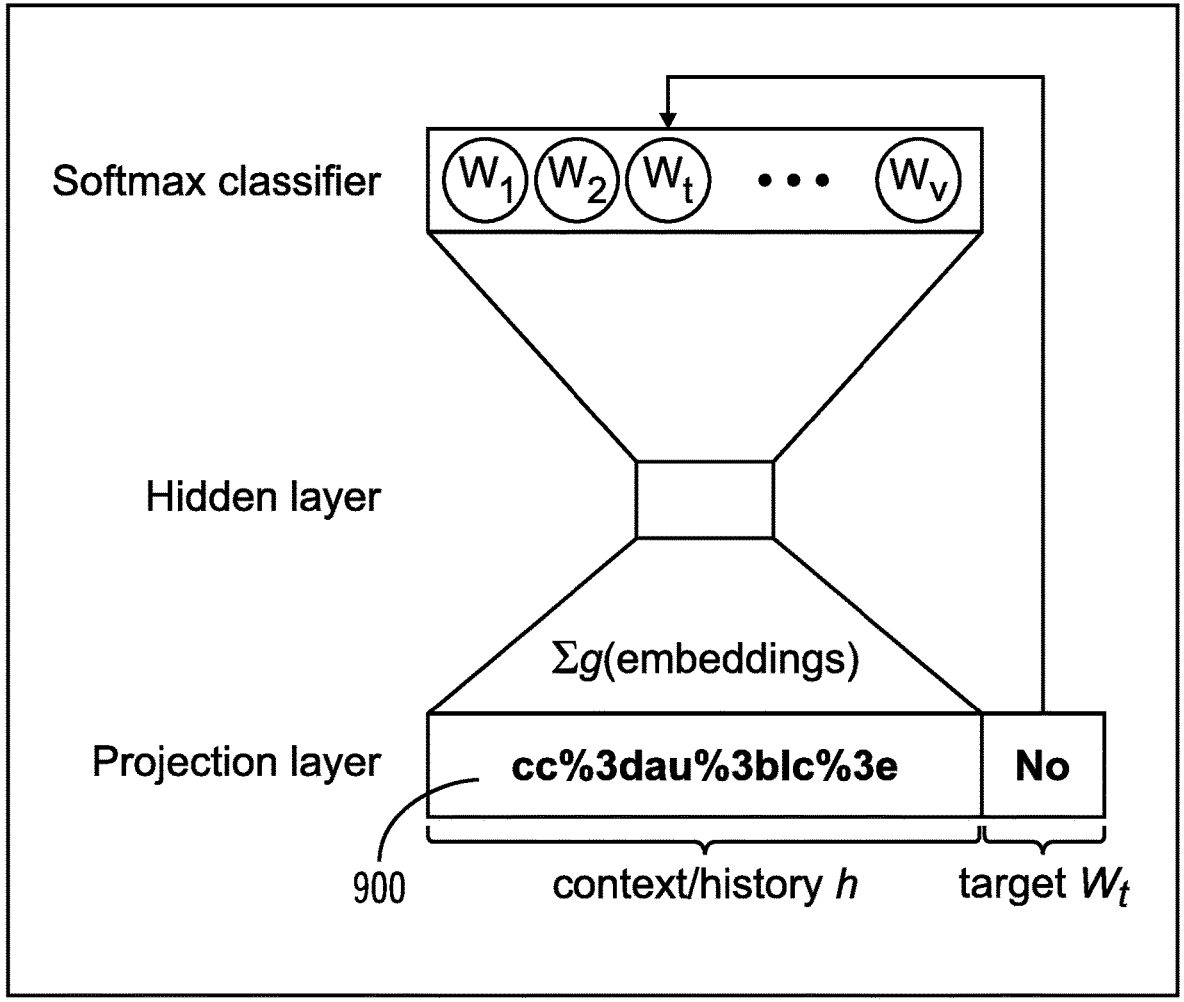
FIG. 9 illustrates word embeddings in accordance with certain embodiments.
Figure 10:
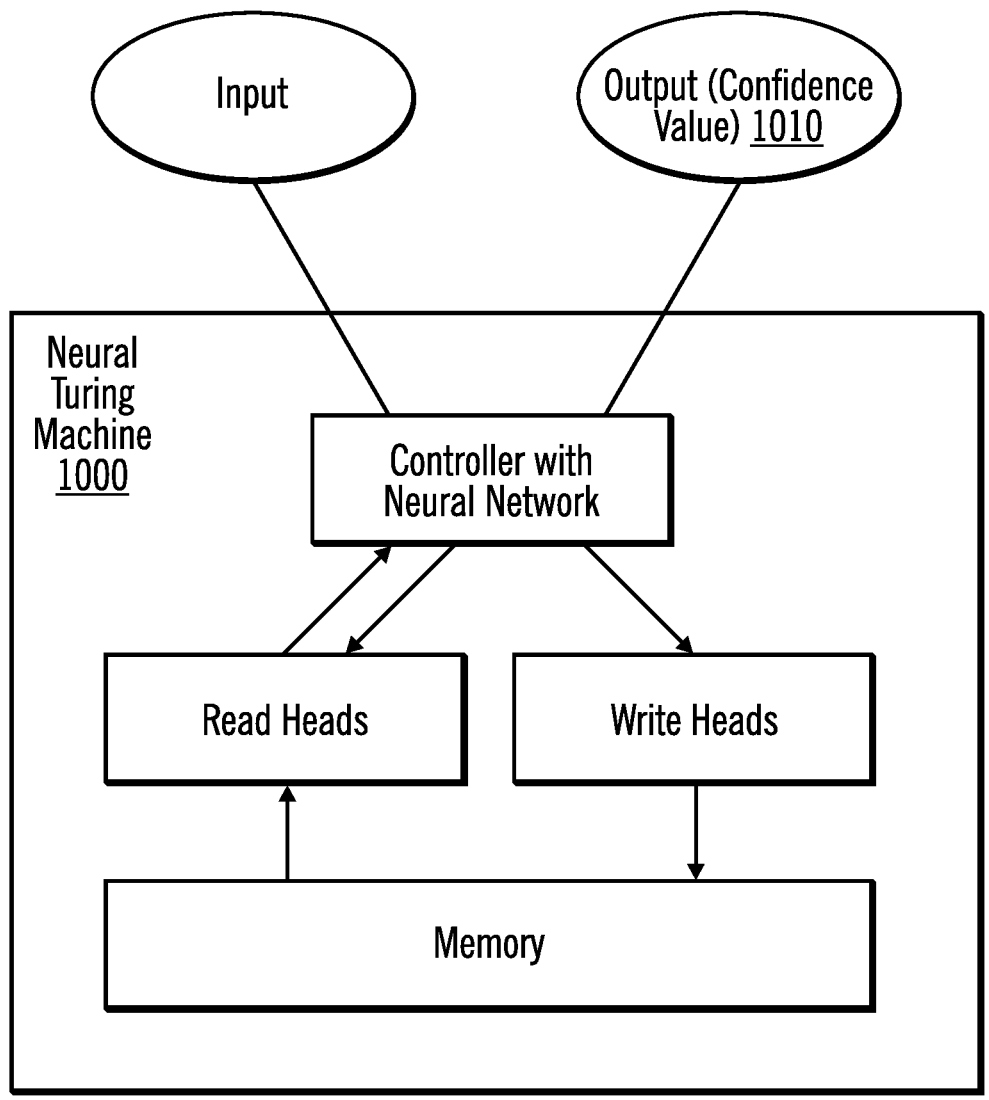
FIG. 10 illustrates an example neural turing machine in accordance with certain embodiments.

In certain embodiments, each of the real cookie values are expanded by a word to vector expansion. Embodiments produce word embeddings to determine whether a cookie pattern is legitimate. FIG. 9 illustrates word embeddings in accordance with certain embodiments. In FIG. 9, the projection layer includes a cookie pattern 900 ("cc%3dau%3blc%3e"), which is non-conforming. In FIG. 9, the target indicates whether the cookie pattern is legitimate. After learning the word embeddings for the real cookies, embodiments then use a neural turing machine to remember the last several word embeddings. FIG. 10 illustrates an example neural turing machine 1000 in accordance with certain embodiments. The output 1010 of the neural turning machine provides a confidence value for a particular word embedding given a context from memory.

The values of cookies may be overwritten by any number of actors. Unlike conventional systems that skip validation of cookies as processes for validation may be expensive to create or for expediency, before processing the values of the cookies, embodiments perform validation of the cookies. This avoids having extraneous or incorrect datums in cookies causing unexplained behaviors.

Embodiments provide the ability to create resistance to rogue actors who may overwrite vital real cookies with non-conforming patterns. This is relevant for large corporations, which have many distributed/global content creation teams, some of who may not "play by the rules". Any actor in the web space may set/reset/delete a given real cookie. A server-side process, a proxy-resident process, a browser-based process, etc. in connection to any web page. In some cases, the larger the scope of the real cookie's applicability is, the more actors are enabled to consume and potentially modify the real cookie. An actor should only modify real cookies that the actor initially set, or if modifying another's real cookie, the modification should be done by the rules of that given real cookie.

The real-time cookie format validation service 150 may be used by companies that trade in crowd-sourced data, such as web analytics and marketing intelligence data aggregators, as most of the infrastructure to collect the crowed-sourced data is already available. Real cookies are an example of data that may be aggregated from crowd sources. Then, the real-time cookie format validation service 150 may be used to process the real cookies to identify patterns.

Embodiments enforce compliance to a pattern within a given real cookie based on the deduced value from crowd sourced observations processed through a big data/analytical engine.

Embodiments enable create a way for developers to consume format validation capabilities in an easy manner to increase adoption of format validation Embodiments enforce real cookies to be compliant to a format, which unlike present methods, is learned and discerned from analysis of repeated empirical observations.

Embodiments determine whether a control cookie corresponding to the real cookie exists. In response to determining that the control cookie does not exist, the control cookie is created using the real cookie as the template/validator, where creating the control cookie includes: collecting cookie header values associated with the real cookie, expanding the collected cookie header values by word to vector expansion to determine word embeddings, and determining a confidence value for each word embedding. Creating the control cookie further includes hashing the real cookie's value if a determination is made of validity. In response to determining that the real cookie and the control cookie exist, the validity of the real cookie is checked against the control cookie. In response to determining that the real cookie is in a corrupted format, the real cookie is deleted and a notification is sent to an admin of cookie violation based on checking the validity of the real cookie.

Figure 11:
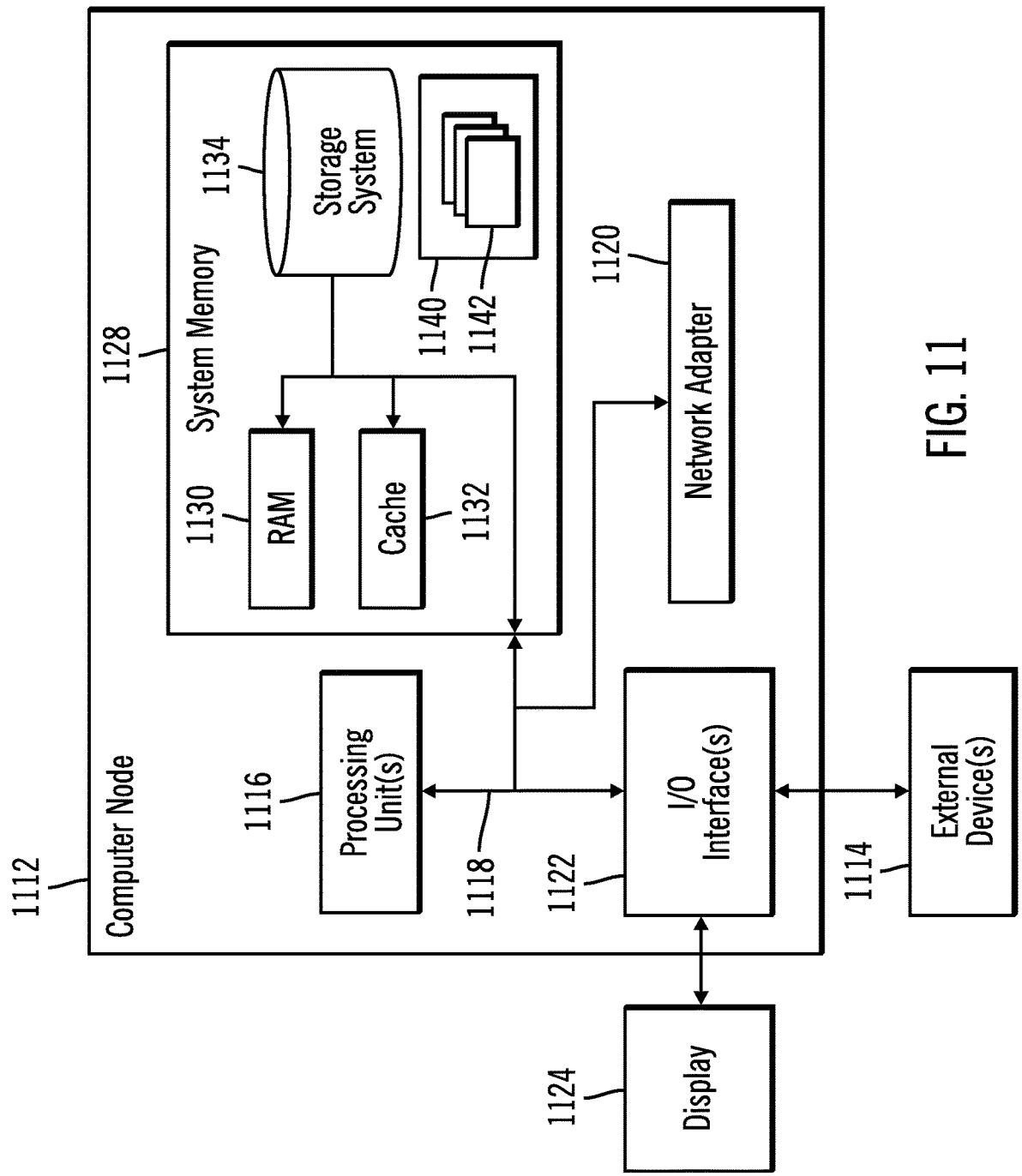
FIG. 11 illustrates a computing node in accordance with certain embodiments.

FIG. 11 illustrates a computing environment in accordance with certain embodiments. Referring to FIG. 11, computer node 1112 is only one example of a suitable computing node and is not intended to suggest any limitation as to the scope of use or functionality of embodiments of the invention described herein. Regardless, computer node 1112 is capable of being implemented and/or performing any of the functionality set forth hereinabove.

The computer node 1112 may be a computer system, which is operational with numerous other general purpose or special purpose computing system environments or configurations. Examples of well-known computing systems, environments, and/or configurations that may be suitable for use with computer node 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1112 may be described in the general context of computer system executable instructions, such as program modules, being executed by a computer system. Generally, program modules may include routines, programs, objects, components, logic, data structures, and so on that perform particular tasks or implement particular abstract data types. Computer node 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer node 1112 is shown in the form of a general-purpose computing device. The components of computer node 1112 may include, but are not limited to, one or more processors or processing units 1116, a system memory 1128, and a bus 1118 that couples various system components including system memory 1128 to one or more processors or processing units 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1112 typically includes a variety of computer system readable media. Such media may be any available media that is accessible by computer node 1112, and it includes both volatile and non-volatile media, removable and non-removable media.

System memory 1128 can include computer system readable media in the form of volatile memory, such as random access memory (RAM) 1130 and/or cache memory 1132. Computer node 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, system memory 1128 may include at least one program product having a set (e.g., at least one) of program modules that are configured to carry out the functions of embodiments of the invention.

Program/utility 1140, having a set (at least one) of program modules 1142, may be stored in system memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer node 1112 may also communicate with one or more external devices 1114 such as a keyboard, a pointing device, a display 1124, etc.; one or more devices that enable a user to interact with computer node 1112; and/or any devices (e.g., network card, modem, etc.) that enable computer node 1112 to communicate with one or more other computing devices. Such communication can occur via Input/Output (I/O) interfaces 1122. Still yet, computer node 1112 can communicate with one or more networks such as a local area network (LAN), a general wide area network (WAN), and/or a public network (e.g., the Internet) via network adapter 1120. As depicted, network adapter 1120 communicates with the other components of computer node 1112 via bus 1118. It should be understood that although not shown, other hardware and/or software components could be used in conjunction with computer node 1112. Examples, include, but are not limited to: microcode, device drivers, redundant processing units, external disk drive arrays, RAID systems, tape drives, and data archival storage systems, etc.

In certain embodiments, the client 100, the web server 120, and/or the proxy server 140 may have the architecture of computer node 1112.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A computer-implemented method for validating a real cookie, comprising:
   determining that a web page with the real cookie is loaded onto a browser at a client;
   determining whether a control cookie exists for the real cookie;
   in response to determining that the control cookie does exist for the real cookie, validating the real cookie against the control cookie; and
   in response to determining that the control cookie does not exist for the real cookie,
      searching for a matching cookie pattern for the real cookie in a cookie patterns database, wherein the matching cookie pattern comprises an expected format for the real cookie and has a confidence value;
      in response to determining that the matching cookie pattern has been found for the real cookie, creating the control cookie; and
      in response to determining that the matching cookie pattern has not been found for the real cookie, deleting the real cookie.

2. The computer-implemented method of claim 1, wherein creating the control cookie includes hashing a value of the real cookie.

3. The computer-implemented method of claim 1, further comprising:
   determining cookie patterns by:
      loading real cookies from a cookies database;
      loading cookie patterns from the cookie patterns database; and
      perform big data analysis on the loaded real cookies to identify new cookie patterns from new observations.

4. The computer-implemented method of claim 1, wherein the validating of the real cookie is performed at one of the browser of the client, a web server, and a web proxy.

5. The computer-implemented method of claim 1, further comprising:
   creating the control cookie by:
      collecting cookie header values associated with the real cookie;
      expanding the collected cookie header values by word to vector expansion to determine word embeddings; and
      determining a confidence value for each of the word embeddings.

6. The computer-implemented method of claim 1, wherein the validating of the real cookie is performed at a computer node in a distributed cloud computing environment.

7. A computer program product for validating a real cookie, the computer program product comprising a computer readable storage medium having program code embodied therewith, the program code executable by at least one processor to perform:
   determining that a web page with the real cookie is loaded onto a browser at a client;
   determining whether a control cookie exists for the real cookie;
   in response to determining that the control cookie does exist for the real cookie, validating the real cookie against the control cookie; and
   in response to determining that the control cookie does not exist for the real cookie,
      searching for a matching cookie pattern for the real cookie in a cookie patterns database, wherein the matching cookie pattern comprises an expected format for the real cookie and has a confidence value;
      in response to determining that the matching cookie pattern has been found for the real cookie, creating the control cookie; and
      in response to determining that the matching cookie pattern has not been found for the real cookie, deleting the real cookie.

8. The computer program product of claim 7, wherein creating the control cookie includes hashing a value of the real cookie.

9. The computer program product of claim 7, further comprising:
   determining cookie patterns by:
      loading real cookies from a cookies database;
      loading cookie patterns from the cookie patterns database; and
      perform big data analysis on the loaded real cookies to identify new cookie patterns from new observations.

10. The computer program product of claim 7, wherein the validating of the real cookie is performed at one of the browser of the client, a web server, and a web proxy.

11. The computer program product of claim 7, further comprising:
   creating the control cookie by:
      collecting cookie header values associated with the real cookie;
      expanding the collected cookie header values by word to vector expansion to determine word embeddings; and
      determining a confidence value for each of the word embeddings.

12. The computer program product of claim 7, wherein the validating of the real cookie is performed at a computer node in a distributed cloud computing environment.

13. A computer system for validating a real cookie, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more computer-readable memories, to perform operations comprising:
      determining that a web page with the real cookie is loaded onto a browser at a client;
      determining whether a control cookie exists for the real cookie;
      in response to determining that the control cookie does exist for the real cookie, validating the real cookie against the control cookie; and
      in response to determining that the control cookie does not exist for the real cookie,
         searching for a matching cookie pattern for the real cookie in a cookie patterns database, wherein the matching cookie pattern comprises an expected format for the real cookie and has a confidence value;
         in response to determining that the matching cookie pattern has been found for the real cookie, creating the control cookie; and
         in response to determining that the matching cookie pattern has not been found for the real cookie, deleting the real cookie.

14. The computer system of claim 13, wherein creating the control cookie includes hashing a value of the real cookie.

15. The computer system of claim 13, further comprising operations for:
   determining cookie patterns by:
      loading real cookies from a cookies database;
      loading cookie patterns from the cookie patterns database; and
      perform big data analysis on the loaded real cookies to identify new cookie patterns from new observations.

16. The computer system of claim 13, wherein the validating of the real cookie is performed at one of the browser of the client, a web server, and a web proxy.

17. The computer system of claim 13, wherein the validating of the real cookie is performed at a computer node in a distributed cloud computing environment.

18. The computer system of claim 13, further comprising operations for:
   creating the control cookie by:
      collecting cookie header values associated with the real cookie;
      expanding the collected cookie header values by word to vector expansion to determine word embeddings; and
      determining a confidence value for each of the word embeddings.

* * * * *